ELECTRONIC COMMON SWITCH FOR A TELEPHONE SET
Filed April 9, 1968
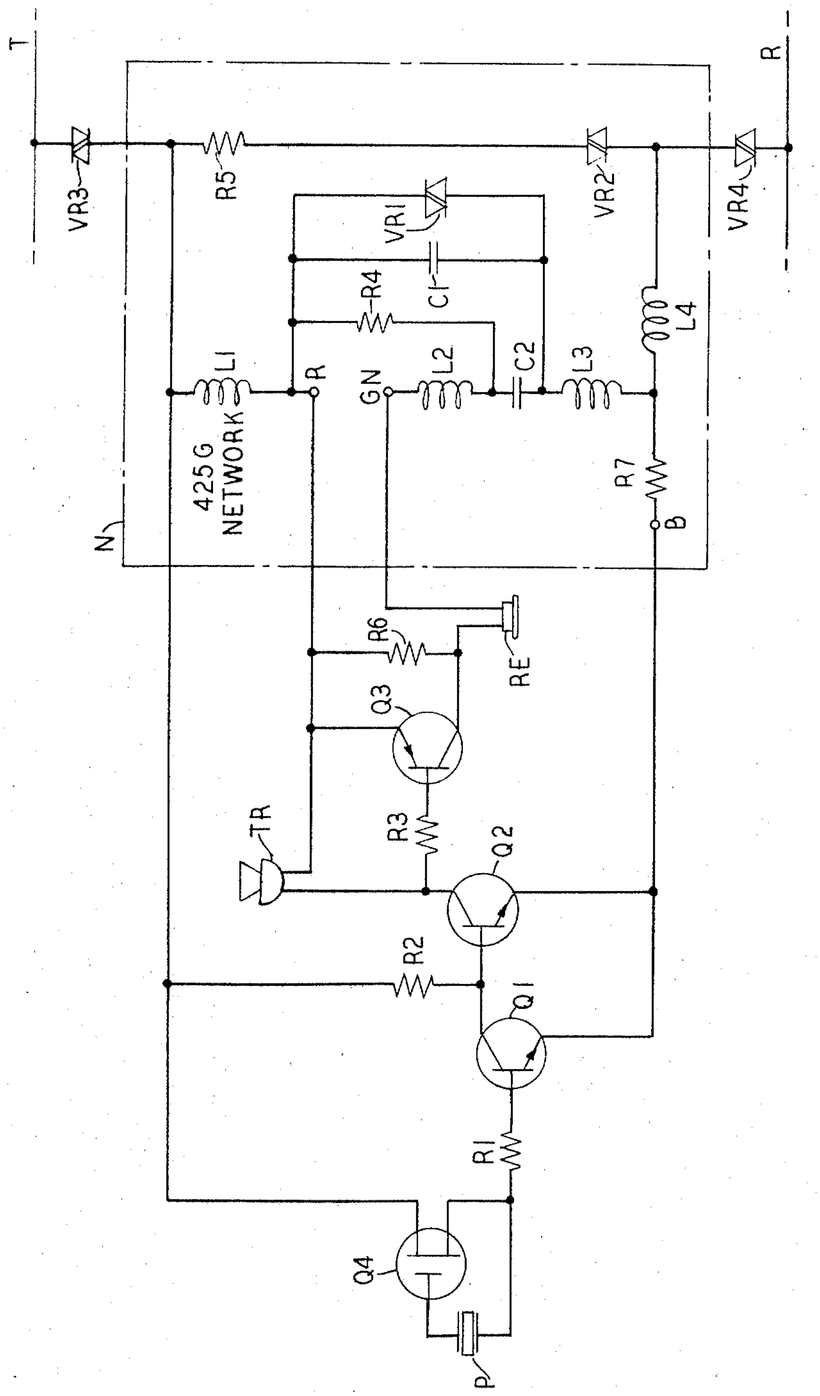
INVENTOR
R. G. JACKSON
BY [signature]
ATTORNEY 3,525,819

ELECTRONIC COMMON SWITCH FOR A TELEPHONE SET

Raymond G. Jackson, West Lafayette, Ind., assignor to Bell Telephone Laboratories, Incorporated, Murray Hill, N.J., a corporation of New York Filed Apr. 9, 1968, Ser. No. 719,898
Int. Cl. H04m *1/00, 1/50*
U.S. Cl. 179—84 9 Claims

ABSTRACT OF THE DISCLOSURE

In a telephone set employing multifrequency dialing the common switch functions of disabling the transmitter and attenuating the receiver during dialing are performed by transistor circuitry, the operating state of which is controlled by the voltage generated by a piezoelectric circuit device that is subjected to mechanical stress during dialing.

BACKGROUND OF THE INVENTION

Field of the invention

This invention relates to subscriber telephone sets and more particularly to the common switch functions of such sets.

Description of the prior art

In the art of telephony, it has long been common practice to provide subscriber sets with a dial-actuated switch, normally termed a "common switch," to perform a number of essential functions that are incorporated with the dial signaling process. Among these essential functions is the disabling of the telephone transmitter which minimizes the possibility of dial signal simulation by noise or voice frequencies that might otherwise be picked up and applied to the line by way of the transmitter. Such protection is especially desirable in multifrequency signaling sets such as the Touch-Tone® telephone, for example. Another common switch function is the attenuation of the receiver output during the generation of dial signals. Such attenuation allows the customer to hear the signals being generated, thus giving him assurance as to the operability of the dial, while limiting to a comfortable level the magnitude of the signal that reaches his ear.

Still other common switch functions include the switching of power to the oscillator circuits, required in multifrequency signaling sets, and the connection of the dial signal to the line.

Heretofore, a multicontact mechanical switch has been employed to perform common switch functions. In multifrequency type dials the common switch is operated by the depression of any one of the digit pushbuttons—the resulting mechanical force also being employed to operate the contacts associated with the particular combination of tuned circuits corresponding, in terms of a multifrequency signal code, to the digit dialed.

All mechanical switches, including the conventional common switch of a telephone set, share certain disadvantages which include wear, exposure to malfunction from accumulated dirt or foreign deposits on the contacts, and the occasional need for mechanical adjustment.

A further disadvantage in employing a mechanical switch for a telephone set common switch is that it is inconsistent with the current direction of telephone development which now points toward a substantially fully integrated set employing monolithic circuit techniques. One example of this type of development is disclosed by R. L. Breeden and R. M. Rickert in application Ser. No. 487,138, filed Sept. 14, 1965, which relates to an integrated multifrequency dial. Another example is disclosed by R. L. Cerbone et al. in application Ser. No. 641,191, filed May 25, 1967, which pertains to the utilization of capacitively operated "touch buttons" in a multifrequency dial in lieu of mechanical switches.

A broad object of the invention is the elimination of the disadvantages indicated which are inherent in known telephone set common switches.

SUMMARY OF THE INVENTION

The broad object and related objects are achieved in accordance with the principles of the invention by the utilization of solid state circuit elements uniquely combined with a piezoelectric device in lieu of a mechanical switch. Specifically, a part of the physical force applied by the customer to effect the generation of a multifrequency dial signal is employed to exert mechanical stress on a piezoelectric element which in turn generates a control voltage. The control voltage is applied to switching transistors which operate to open the circuit of the transmitter, thereby disabling it and to connect additional resistance into the circuit of the receiver, thereby attenuating its output.

BRIEF DESCRIPTION OF THE DRAWING

The single figure of the drawing is a schematic circuit diagram of a portion of a telephone set in accordance with the invention.

DESCRIPTION OF AN EMBODIMENT

In the drawing the network N is fully conventional and is included merely to show an illustrative interconnection between a circuit in accordance with the invention and the TIP and RING of a telephone line. The function of the circuit elements in the network N are thus well known and need not be described herein. These components include the hybrid coil with the windings L1 through L4, the resistors R4, R5 and R7, the capacitors C1 and C2 and the varistors VR1, VR2, VR3 and VR4. Connection of the circuit in the manner shown also provides a means for conducting circuit tests, the results of which are described hereinbelow.

The circuit of the invention comprises a receiver RE which is connected in series with the emitter-collector junction of a transistor Q3 across the terminals R and GN. A resistor R6 shunts the junction indicated. Similarly, a transmitter TR is connected in series with the emitter-collector junction of a transistor Q2 across the terminals R and B and a resistor R3 connects the collector of the transistor Q2 to the base of the transistor Q3.

The emitter-collector path of an additional transistor Q1, in series with a resistor R2, is connected between the terminals RR and B, while the base of the transistor Q1 is also connected to the terminal RR by way of the series combination of a resistor R1 and the source-drain path of the FET transistor Q4. Finally, a two-terminal piezoelectric circuit device P, which may be a small bar of PZT, for example, is connected between the gate electrode of the FET transistor Q4 and its source (or drain) electrode.

The function of each of the circuit elements may best be presented in terms of a description of the operation of the circuit. During the talking mode, there is no voltage across the piezoelectric bar P, and hence, the FET transistor Q4 is an open circuit which results in biasing transistor Q1 near cut-off. With transistor Q1 off, transistor Q2 is saturated through the resistor R2, and the transmitter TR along with resistor R3 are connected to terminal B of the network N. With the potential at resistor R3 differing slightly from the level of the potential at terminal B, transistor Q3 is provided with bias current which produces a low dynamic impedance from its collector to emitter, thus connecting the receiver RE to point R of the network N. In the dialing mode, voltage is produced across the piezoelectric bar P by deforming the bar. Such deformation may be effected by any suitable mechanical linkage (not shown) between the dial (not shown) and the piezoelectric bar P. This voltage gates the FET transistor Q4 on, saturating the transistor Q1. When transistor Q1 saturates, the potential on its collector as well as the potential on the base of transistor Q2 is dropped to the same level as the potential on the emitter of transistor Q1. This action cuts off transistor Q2 which in effect disables the transmitter TR and turns off transistor Q3 by raising the potential on the collector of transistor Q2 above the potential level at terminal B. With transistor Q3 cut off, the attenuating resistor R6 is effectively placed in series with the receiver RE.

A number of tests have been performed on a circuit of the type shown in the figure to determine its feasibility. For example, the circuit was first tested to determine whether the transmitter and receiver were properly connected in the talking mode. Current through the transmitter was measured and the output of the receiver was measured with a 1 kHz. signal placed on the line. With 25 ma. through the transmitter and a 1 volt drop across the receiver during the talking mode, the transmitter current dropped to .001 ma. and the receiver dropped about 31 db when the piezoelectric bar P was deflected, indicating that the circuit performs basically as desired. The circuit also indicated proper performance with loop curretns as low as 20 ma.

In one circuit designed in accordance with the principles of the invention, the following standard commercially available active circuit components were employed:

Transistors Q1 and Q2—40 a.
Transistor Q3—2N2894
Transistor Q4 (FET)—2N4351

It is to be understood that the embodiment described herein is merely illustrative of the principles of the invention. Various modifications thereto may be effected by persons skilled in the art without departing from the spirit and scope of the invention.

What is claimed is:

1. In a telephone set, in combination, a transmitter, a receiver, a pair of terminals connectable to a telephone line, first means responsive to manual dialing pressure for generating a control voltage, second means responsive to said control voltage for disabling said transmitter, and third means responsive to said control voltage for attenuating the output of said receiver.

2. Apparatus in accordance with claim 1 wherein said first means comprises a piezoelectric material.

3. Apparatus in accordance with claim 2 wherein said second means includes a FET operatively responsive to an output voltage from said material.

4. Apparatus in accordance with claim 2 wherein said third means includes means connecting said receiver across said terminals, said last named means including a resistive circuit device, a transistor having its collector-emitter path connected in shunt relation with said device, said transistor being held in a substantially saturated condition when said set is in the transmitting-receiving mode of operation, and said transistor being shifted to a cut-off condition in response to said control voltage.

5. In a telephone set, in combination, a speech network including a pair of terminals, a transmitter, a receiver, means including a first transistor connecting said receiver across said terminals, a first resistive circuit element shunting the normally conducting path provided by said first transistor, means including a second transistor providing a normally conductive path connecting said transmitter across said terminals, means responsive to manual force applied to initiate dialing signals for generating a control voltage, and means responsive to said control voltage for switching said first and second transistors to a substantially cut-off state, thereby to disable said transmitter and to attenuate said receiver during the generation of dialing signals.

6. Apparatus in accordance with claim 5 wherein said switching means comprises a third transistor, said third transistor having its collector electrode connected to the base electrode of said second transistor and its emitter electrode connected to the emitter electrode of said second transistor, said generating means being connected between the base and collector electrodes of said third transistor.

7. Apparatus in accordance with claim 6 wherein said generating means comprises a field effect transistor and a piezoelectric element connected across two of the terminals of said FET, a second resistive circuit element connected between the collector of said third transistor and the free terminal of said FET, and a third resistive circuit element connected between the base of said third transistor and the common junction of said FET and said piezoelectric element.

8. Apparatus in accordance with claim 6 including a resistive element connected between the collector of said second transistor and the base of said first transistor, said transmitter being connected between the collector electrode of said second transistor and the emitter electrode of said first transistor.

9. In a telephone set employing multifrequency dialing, in combination, a speech network including a pair of terminals, a receiver and a first resistor in series relation connected across said terminals, a first transistor having its emitter-collector path connected in shunt with said first resistor, a transmitter and the emitter-collector path of a second transistor being connected in series relation across said terminals, said first and second transistors being in a normally saturated state, a third transistor having the collector electrode thereof connected to the base electrode of said second transistor and the emitter thereof connected to the emitter of said second transistor, a FET, a second resistor connecting one electrode of said FET to the collector electrode of said third transistor, a third resistor connecting a second electrode of said FET to the base of said third transistor, a fourth resistor connecting the collector of said second transistor to the base of said first transistor, and a two-terminal piezoelectric device connected between said second electrode of said FET and the gate electrode of said FET, whereby mechanical stress applied to said device in the course of dialing produces a voltage causing said FET to conduct, whereupon said third transistor saturates, said first and second transistors are switched to a cut-off state, said transmitter is disabled and the output of said receiver is attenuated.

References Cited

UNITED STATES PATENTS

| | | |
|---|---|---|
| 3,200,205 | 8/1965 | Herter. |
| 3,433,902 | 3/1969 | Butcher et al. |

KATHLEEN H. CLAFFY, Primary Examiner
W. A. HELVESTINE, Assistant Examiner

U.S. Cl. X.R.

179—90